Mar. 27, 1923.  1,449,646
C. E. BATHRICK ET AL
AUTOMATIC RELIEF VALVE
Filed Apr. 9, 1919.  2 sheets-sheet 1

Charles E. Bathrick
Alfred C. Mecklenburg
INVENTORS
By George J. Oltsch
ATTORNEY.

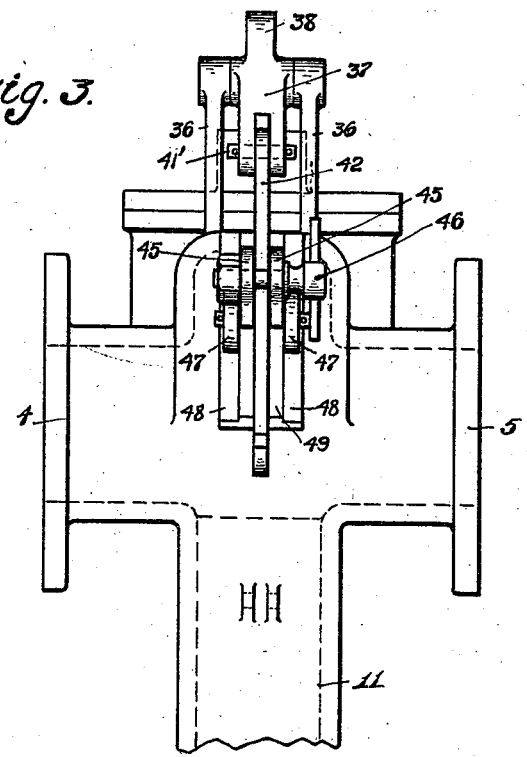
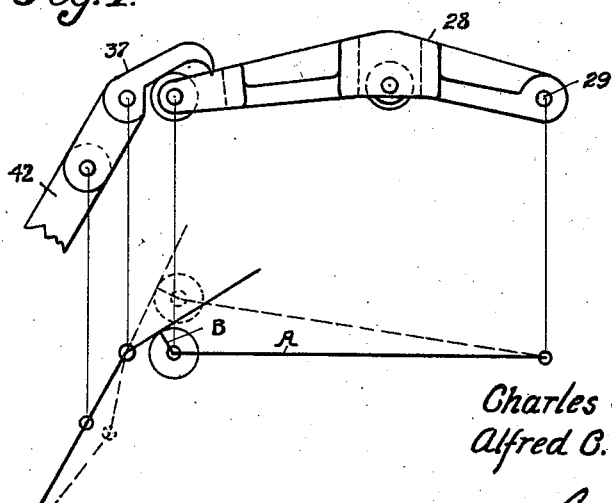

Patented Mar. 27, 1923.

1,449,646

UNITED STATES PATENT OFFICE.

CHARLES E. BATHRICK AND ALFRED C. MECKLENBURG, OF SOUTH BEND, INDIANA, ASSIGNORS, BY DIRECT AND MESNE ASSIGNMENTS, TO STUTZ FIRE ENGINE COMPANY, OF INDIANAPOLIS, INDIANA, A CORPORATION OF INDIANA.

AUTOMATIC RELIEF VALVE.

Application filed April 9, 1919. Serial No. 288,821.

*To all whom it may concern:*

Be it known that we, CHARLES E. BATHRICK and ALFRED C. MECKLENBURG, citizens of the United States, residing at South Bend, in the county of St. Joseph and State of Indiana, have invented certain new and useful Improvements in Automatic Relief Valves, of which the following is a specification.

The invention relates to an improvement in automatic relief valves, designed particularly for use in connection with the force pumps of fire engines, whereby the pump pressure, incident to the cutting off of the hose or other outlet, may be automatically relieved to avoid damage.

In ordinary force pump constructions of this type, should the water outlet be cut off, as by closing the hose nozzle for any purpose, the continued pump operation results in a constantly increasing pressure, with a tendency to damage the pump through overload, or results in the bursting of the hose.

The improved relief valve is designed to automatically compensate for an increase of pressure under these conditions, and to act through and by such increased pressure to open a by-pass arranged between the valve and pump, to thereby establish a circulatory path including the pump, and thus maintain an approximately normal pump pressure.

It is highly desirable in relief valves of this character, that they be sensitive to a variation of pressure above and below the predetermined safety limit, in order that the valve may fully open at a pressure slightly above the predetermined degree, and fully close at a pressure slightly below the predetermined degree.

As the valve is automatic in its action, means must be provided for closing the valve when the pump pressure falls below the predetermined point, and as such means will necessarily act to retard the opening of the valve, except at or above the predetermined point, it is apparent that such mechanical valve closing means must automatically compensate for its own resistance to the pressure beyond the predetermined point. If such automatic compensation were not provided for the valve, it would be initially responsive and slightly opened by a pressure slightly above the predetermined point, but the valve would not fully open except under a pressure greatly in excess of the predetermined point, which excess pressure, under certain circumstances, might be sufficient to produce an overload on the pump or burst the fire hose.

The automatic compensation of the mechanical valve closing means forms a material part of the present invention, and, generally stated, is constructed to increase the pressure effect on the mechanical valve closing means proportionally to the increase in pressure above the predetermined point, and conversely, to decrease the pressure effect thereon as the pressure reduces to the predetermined point.

The invention in the preferred form of details will be described in the following specification, reference being had particularly to the accompanying drawings, in which:—

Figure 3 is an end elevation of the same.

Figure 4 is a view illustrative of the mechanical valve closing compensation.

Figure 1:
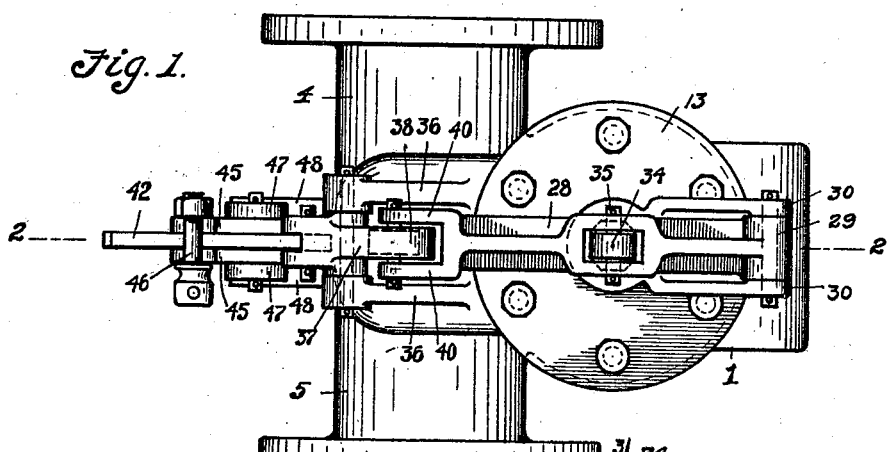
Figure 1 is a plan view of the improved valve.
Figure 2:
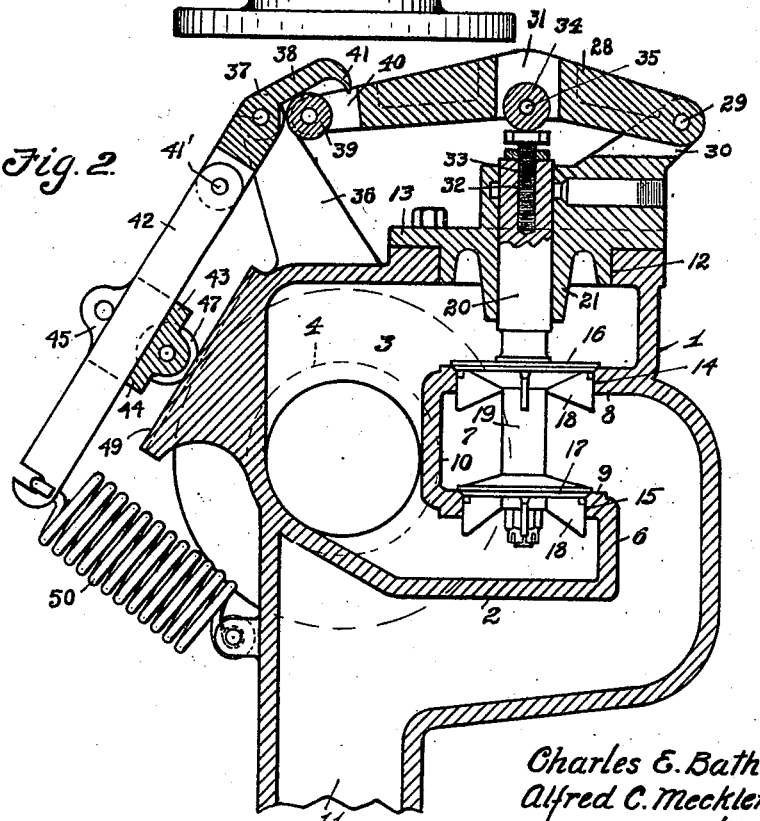
Figure 2 is a vertical section, partly in section, taken on the line 2—2 of Fig. 1.

The improved valve comprises a casing 1, having an interior partition 2, forming a main pressure chamber 3. The side walls of the casing have lateral extensions 4 and 5, opening in the chamber 3, and preferably alined transversely of the casing. These pipe extensions 4 and 5 constitute the inlet and outlet of the valve casing, and may be provided with means of any type for connection in the pressure line of a fire engine.

The partition 2 terminates short of the forward wall of the casing, and has an upwardly extending end section 6, and within the chamber 3 is arranged an auxiliary chamber 7, formed by the upper and lower walls 8 and 9 and the side wall 10. The upward wall 8 is integral with the forward wall of the casing 1, while the lower wall 9 is integral with the section 6 of the partition 2. The bottom of the valve casing is spaced from the partition 2, and the casing has an outlet conduit 11 depending therefrom and in communication with the chamber 7 around the partition 2. This outlet 11 forms the relief by-pass, and will be so termed hereinafter.

The top of the valve casing is formed with an opening 12 adapted to receive a cap 13, to be secured thereto in any water tight manner, and in the walls 8 and 9 of the chamber 7, in alinement with the opening 12, are formed openings 14 and 15 appropriately shaped to provide valve seats. Upper and lower valves 16 and 17 cooperate with the seats, the valves being of the usual disk form with guiding webs 18 depending from their lower surfaces. The valves 16 and 17 are connected to or secured on a valve rod 19, which, above the upper valve 16, is slightly enlarged at 20, and vertically operative in an elongated bearing 21 forming a part of the cap 13. The valve 16, and therefore the opening 14, is slightly larger than the valve 17, to permit convenient withdrawal of the valve 17 through the opening 14, or its insertion therethrough in assembling the parts. The upper or pressure exposed surface of the valve 16 is, however, slightly less than the similar or lower pressure exposed surface of the valve 17, owing to the projection of the valve rod from the upper surface of the valve 16, so that the valves are nearly balanced, with the pressure margin slightly in favor of the lower valve, or in the valve opening direction.

An essential feature of the present invention consists in the mechanical means for closing the valves 16 and 17, and maintaining said valves closed except at or above the predetermined pressure. This means has as a resistance element a spring, and as such naturally increases its resistance in proportion to its expansion, being a contractive spring, it will be apparent that, if the relief valve is to fully open and close under a small variation only in pressure above and below the predetermined point, provision must be made to compensate for such variation of spring tension. The improved means here shown to this end comprises a lever 28 pivotally supported at 29, between ears 30 projecting from an enlarged portion of the cap 13, said lever being formed in line with the piston rod 19 with an aperture 31. The valve rod 19 is formed in its upper end with a threaded bore 32 to receive a headed threaded rod 33, upon which bears a roller 34, mounted in the aperture 31 of the lever 28, and by means of which rod 33 desired adjustment may be had between the valve rod 19 and the lever 28.

The casing 1 is provided on the upper wall, remote from the pivot 29 of the lever 28, with spaced upstanding ears 36, between which is pivotally supported a compensating lever 37. Said lever is formed, at what may be termed its upper end, with an arm 38 of reduced width adapted to overlie and bear upon a roller 39 mounted between ears 40 formed on the free end of the lever 28, which latter will be hereinafter termed the lifting lever. The free end of the arm 38 of the compensating lever is preferably down turned or hooked, as at 41, to prevent the roller 39 riding off of the end thereof. The lower end of the compensating lever is pivotally connected at 41' to a pressure lever 42, adjustably mounted upon a moving fulcrum 43. This fulcrum comprises a base 44 having spaced side sections 45, between which the lever 42 is adapted to snugly fit, the upper ends of the sides being connected by a draw bolt 46. The fulcrum may, by obvious use of the draw bolt, be clamped at any desired point on the pressure lever to vary the leverage of the latter under the influence of a contractile spring 50, connected at its ends respectively with the lower end of said lever and the valve casing. It will thus be apparent that, by shifting said fulcrum, the predetermined point of resistance to the opening of the relief valves may be readily varied. The fulcrum base 44 is supported upon rollers 47 adapted for travel in track-like depressions 48 formed in the table 49 provided as an integral extension of the rear wall of the casing.

The general operation of the relief valve is as follows:

With the mechanical valve closing means set at a predetermined point, as long as the fluid pressure in the chamber 3 is at or below this point, the valves 16 and 17 will not be affected. The current path will then be into said chamber 3 through the inlet 4 and outwardly from said chamber through the outlet 5. If, however, the pressure within the chamber is increased beyond such predetermined point, as, for example, by closing the nozzle of a hose in communication with the outlet 5, the valves 16 and 17 will be opened by such increased pressure, so that the chamber 3 will be in communication with the relief by-pass 11. However, in this connection, the resistance of the spring 50 would ordinarily increase proportionately with the opening movement of the valves, and, if said spring was set to hold the valves closed at a predetermined pressure, such pressure would have to be very materially exceeded before the valves would be fully opened, or full relief had. As it is highly desirable that the relief valves fully open and close under comparatively slight variations from the predetermined pressure, which permits the required adjustment of the valve control means to be easily calculated and made to vary the predetermined pressure point, such proportional resistance of the spring must be compensated for. This is secured primarily by the cooperation of the lifting lever 28 and compensating lever 37. This arm 37 is set at an angle to the direction of movement of the free end of the lifting lever, that is, the roller 39, so that in closed position the bearing point of the arm is approximately vertical above the shaft of the roller 39. As the free end of the lifting lever carrying said roller moves upwardly under the influence of the lifting relief valves, the contact with the arm 38 of the compensating lever moves outwardly relative to the shaft of the roller 39. The lever 28 and its roller 39 may thus be likened to a toggle, of which they form the links, with the shaft of the roller serving as the knuckle or hinge. Thus, as diagrammatically illustrated in Fig. 4, as the roller moves upwardly the relative degree of angularity of the links, as designated by A and B, progressively lessens, and in consequence increases the leverage thereof in proportion as the links straighten out, thus compensating for the progressively increasing resistance of the spring 50, which is thus without effect upon the movement of the valves 16 and 17, which are thus responsive to slight variations from the predetermined pressure which the spring is set to oppose. It is of course apparent that, by adjusting the fulcrum 43 of the lever 42, the predetermined resistance of the spring may be varied to thereby vary the pressure at which the relief by-pass will be opened. The reverse, or closing action of the spring, is, of course, reversely affective on the valves, in that it acts through a gradually decreasing leverage as the force of the spring decreases. Hence, when the pressure in the chamber 3 falls below the predetermined pressure, the valves 16 and 17 will fully close, and the normal flow through the valve again restored.

It follows from the foregoing that, for example, by installing the improved relief valve in the pressure line of a fire engine pump, with which the leads of hose are connected, and connecting the by-pass of the valve with the intake or suction end of the pump, the firemen may shut off the flow at the nozzle without danger of throwing an overload on the pump, or cause the hose to burst under excessive pressure, which would otherwise result without first stopping the pump. The pump may thus continue in operation notwithstanding the pressure line is closed. Such automatic control of the relief valve under the influence of the water pressure, permits such control to be exercised at a place remote from the engine. Thus the nozzlemen of a fire company may be located within a building, or quite remote from the engine, so that considerable delay would ensue if necessary to first signal the engineer to shut off the pump before the hose could be properly handled, as might be necessary preliminary to ascending ladders, changing positions, or to avoid unnecessary flooding of a building. By simply shutting off the flow at the nozzle, the rising pressure causes the relief valves to open and the water outlet will be through the by-pass into the suction line of the pump, thus circuiting the flow and preventing the pressure, under the continued operation of the pump, from rising above the predetermined or danger point. The normal stream and pressure is restored by simply opening the nozzle, and the time otherwise lost in signalling to start or stop the pump is thus obviated. As time is of the utmost importance in fighting a fire, the great advantage resulting from the use of our improved relief valve will be obvious.

While the foregoing is the preferred form of our invention, we desire it to be understood that we do not limit ourselves to the precise structure shown and described, as it is obvious that various modifications may be made without departing from the spirit of the invention.

What is claimed is:—

1. An automatic relief valve comprising a casing having a main pressure chamber, a relief by-pass opening from said chamber, a valve normally closing the by-pass against the chamber, a lever connected to the valve, a lever mounted on the casing, a spring connected to one end of the latter lever, and an automatic spring compensating connection between said levers to compensate variations in spring resistance due to displacement of the valve and means for varying the fulcrum of the casing lever to adjust the valve to different opening pressures.

2. An automatic relief valve having a by-pass, a valve controlling the same, a lifting lever connected to said valve, a spring lever mounted on the valve casing, a spring connected to said spring lever, and a compensating lever connected to the spring lever and engaging the lifting lever at distances from the fulcrum of such lever automatically varying as and in proportion to the variation of the spring resistance in operation.

3. An automatic relief valve having a valve controlled by-pass, mechanical means for normally maintaining said by-pass closed, said means including a series of connected levers with spring resistance, said levers coacting to vary the leverage in accordance with and proportional to the variation in resistance of the spring resistance and means for varying the fulcrum of one of the levers to adjust the valve to different opening pressures.

4. An automatic relief valve comprising a casing, a valve controlled by-pass leading therefrom, a spring for normally maintaining the by-pass closed, and a series of levers operated by the spring to control the valve, two of said levers being engaged and coacting to permit a relative variation of leverage therebetween in accordance with and proportional to the variation in resistance of the spring under operation.

5. An automatic relief valve comprising a casing, a valved by-pass leading therefrom, a lifting lever connected to the valve of the by-pass, a spring lever mounted on the casing, a spring connected to said spring lever, and a compensating lever connected to the spring lever and bearing on the lifting lever, said bearing point shifting in the movement of said levers to vary the leverage thereof in accordance with and proportional to the variation in resistance of said spring under displacement of the valve.

6. An automatic relief valve comprising a casing formed with a pressure chamber, a by-pass leading therefrom, a valve normally closing the by-pass and responsive to the pressure within the chamber, a mechanical means supported by the casing to operate the valve in opposition to the pressure in said chamber, said means including a lifting lever adjustably connected with the valve, a spring-operated lever mounted on the casing, and a compensating lever connected to the spring-operated lever and bearing on the lifting lever at varying lever lengths under displacement of the valve.

In testimony whereof we affix our signatures.

CHARLES E. BATHRICK.
ALFRED C. MECKLENBURG.